Mar. 13, 1923.
J. E. DOBSON ET AL.
ENSILAGE PACKING DEVICE.
FILED JULY 24, 1922.
1,448,616
3 SHEETS—SHEET 1.
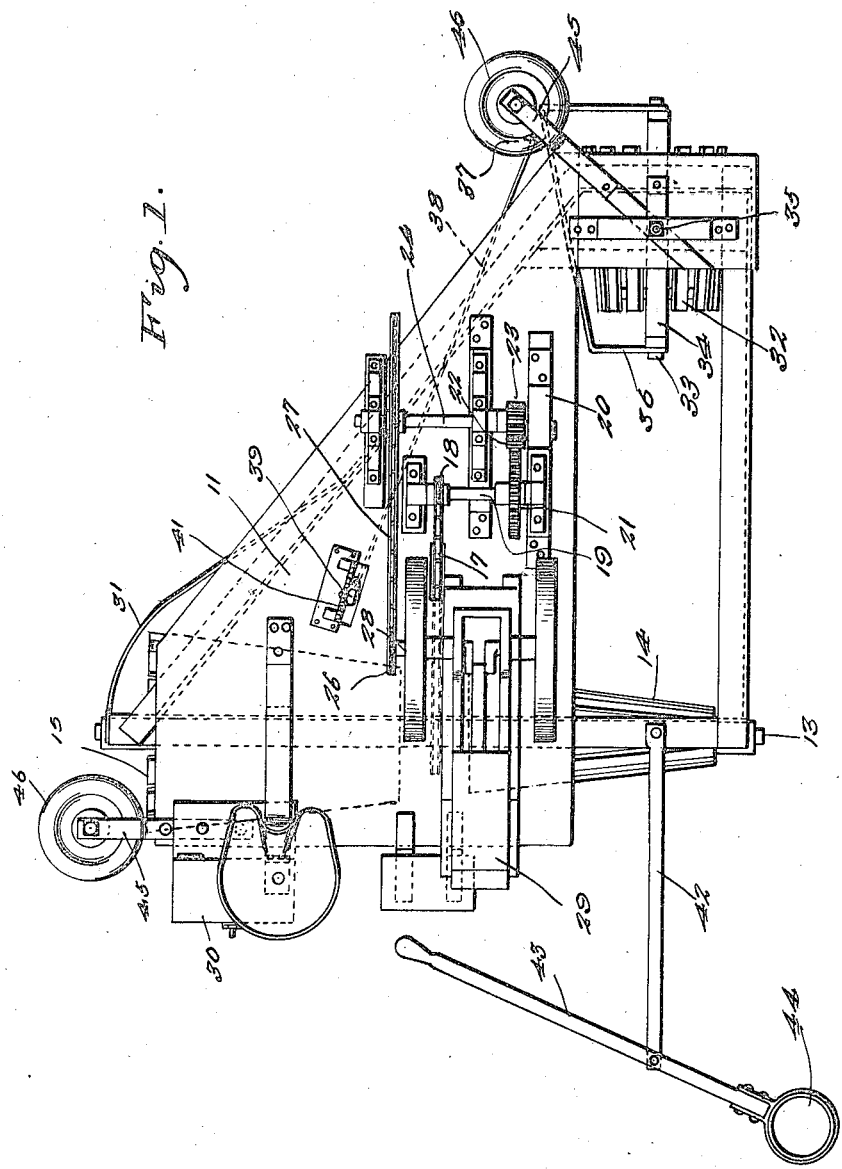
John E. Dobson
S. M. Crookshank  INVENTOR
BY Victor J. Evans
ATTORNEY
WITNESSES

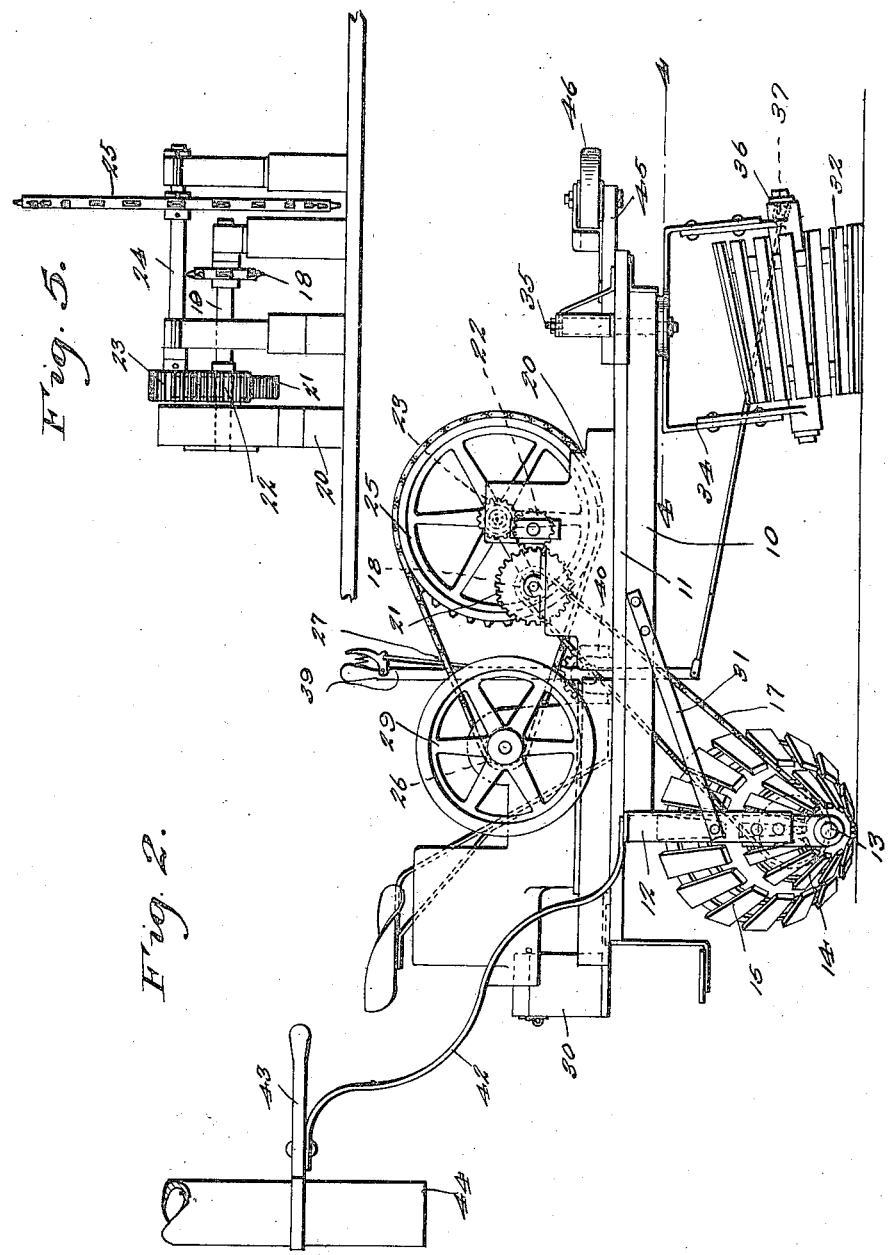

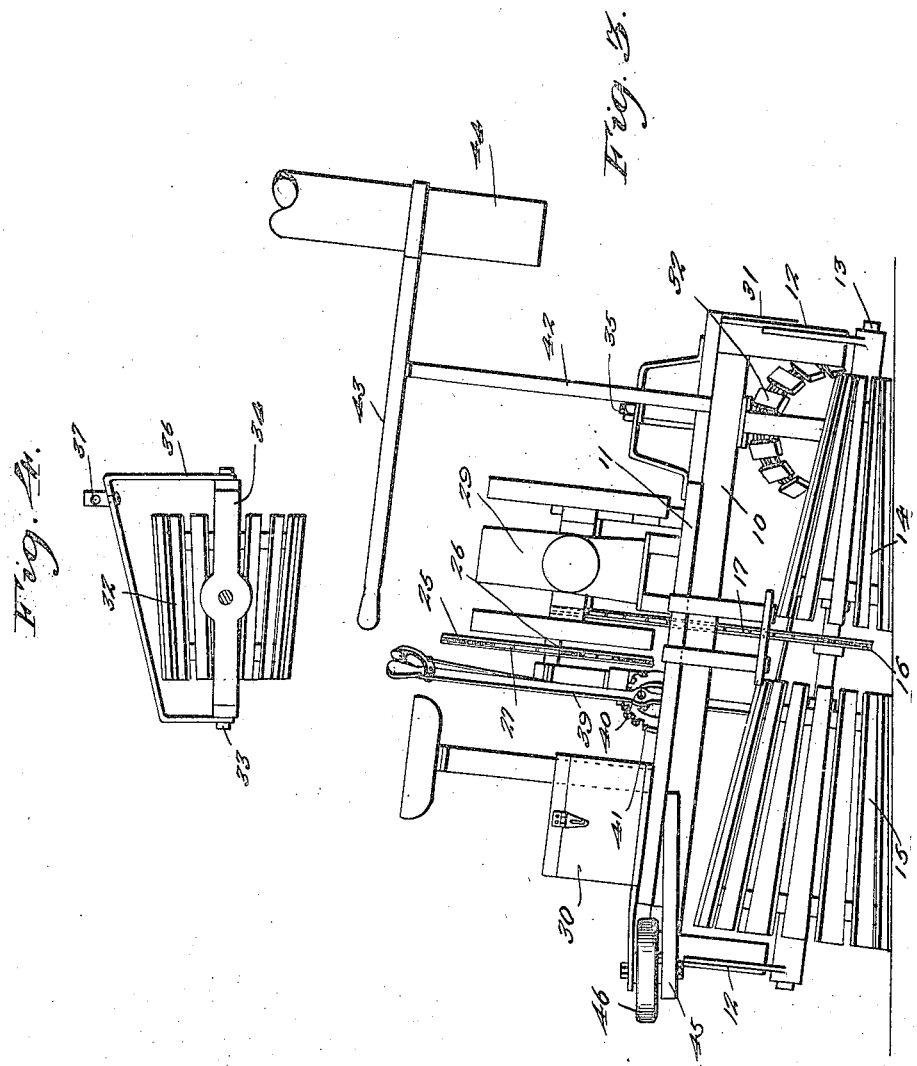

Patented Mar. 13, 1923.

1,448,616

UNITED STATES PATENT OFFICE.

JOHN E. DOBSON AND SAMUEL M. CROOKSHANK, OF KNOXVILLE, TENNESSEE.

ENSILAGE-PACKING DEVICE.

Application filed July 24, 1922. Serial No. 577,095.

*To all whom it may concern:*

Be it known that we, JOHN E. DOBSON and SAMUEL M. CROOKSHANK, citizens of the United States, residing at Knoxville, in the county of Knox and State of Tennessee, have invented new and useful Improvements in Ensilage-Packing Devices (Case B), of which the following is a specification.

This invention relates to improvements in packing machines, especially designed for packing ensilage and is an improvement upon patent numbered 1,328,728, granted to us January 20, 1920.

An object of the present invention is the provision of a machine for packing ensilage within a silo, in which the direction of travel of the machine may be controlled and the pivot shaft or center pole of the above named patent, eliminated, so that the machine will be capable of use within silos of different diameters.

Another object of the invention is the provision of a packing machine of this character having guiding means which may be adjusted and held in adjusted position, whereby the direction of travel of the machine may be slightly changed at intervals, so as to insure uniform packing.

Another object of the invention is the provision of guard rollers so arranged as to engage the walls of a silo and deflect the machine inward when its radius of travel exceeds the radius of the silo, so that injury to either the silo or the machine will be prevented.

With the above and other objects in view, the invention further includes the following novel features and details of construction, to be hereinafter more fully described, illustrated in the accompanying drawings and pointed out in the appended claims.

In the drawings:—

Figure 1 is a top plan view of an ensilage packing machine constructed in accordance with the invention.

Figure 2 is a side view of the same.

Figure 3 is a rear end view.

Figure 4 is an enlarged fragmentary horizontal sectional view on the line 4—4 of Figure 2.

Figure 5 is a detail elevation of the driving gears.

Referring in detail to the drawings, wherein like characters of reference denote corresponding parts, the machine is shown as comprising a frame 10, upon which is mounted a platform 11, the latter being designed to support the power mechanism, as will be hereinafter set forth.

Extending downwardly from the frame 10 at each end of the rear of said frame are bearing brackets 12, whose lower ends carry a shaft 13. Mounted upon this shaft are packing rollers 14 and 15, both of said rollers being of frustro-conical shape, the roller 14 being of less diameter than the roller 15, while the peripheries of these rollers are similarly tapered, that is, the angles formed by the sides and ends of the rollers are the same. The rollers 14 and 15 are spaced apart and mounted upon the shaft 13 between these rollers is a sprocket wheel 16. This wheel is connected by a chain 17 with a relatively small sprocket wheel 18, the latter being secured upon a shaft 19 which is mounted in bearings supported upon bearing standards 20. The shaft 19 also has secured thereon a spur gear 21, which meshes with a pinion 22 and the latter in turn meshes with a pinion 23 which is secured upon a shaft 24. This last mentioned shaft is also mounted in bearings supported by the bearing standards 20 and has secured thereon a relatively large sprocket wheel 25. The sprocket wheel 25 is connected to a small sprocket wheel 26 by means of a sprocket chain 27, while the sprocket wheel 26 is mounted upon the drive shaft 28 of an engine motor 29. It is preferred to equip the machine with an internal combustion engine and for this purpose the machine carries a battery box 30, which may house a battery for the supply of current to the ignition devices of the engine. The bearing brackets 12 may be braced in any suitable manner, for example, brace rods 31 may connect each of the brackets 12 with the machine frame.

The front end of the machine is supported by a combined packing and guide roller 32. This roller is mounted upon a shaft 33 having bearings in a bearing yoke 34. The yoke 34 is connected to the forward end of the frame 10 by means of a king pin 35, which passes through said yoke and through a bearing plate carried by the frame. Connected to the shaft 33 is a guide yoke 36 and the latter has connected thereto as shown at 37, one end of a guide bar or rod 38. The opposite end of this rod is connected to one end of a controlling lever 39 which is pivotally mounted as shown at 40 upon a bracket supported upon the platform 11. The controlling lever 39 passes through an opening in the platform and may be pivotally moved to move the bearing yoke 34 upon the king pin 35, so as to control the direction of travel of the machine. The controlling lever 39 is held in adjusted position by means of a spring actuated latch which engages a toothed segment 41 supported upon the bracket which supports the lever 39. By this means the guide roller 32 may be set, whereupon the machine will travel in a circle of a given radius and by adjusting the controlling lever 39 slightly, from time to time, the ensilage or other material being packed by the machine may be evenly packed.

Extending from the frame 10 of the machine is a bar 42, which has one end pivotally secured to said frame and its opposite end pivotally secured to a controlling lever 43 which extends from the distributing spout 44 of a silo.

The machine frame as shown is of substantially triangular form in plan and its inclined edge or hypothenuse is adapted to travel in line with the circumference of a silo, while the angle formed by the juncture of the base and altitude of the triangle provides an imaginary pivot about which the machine will travel. Extending beyond the side of the machine near each end thereof is an arm 45, whose outer end carries a guard roller 46. These rollers are designed to engage the inner wall of the silo in the event of the radius of travel of the machine being greater than the radius of the silo, so that injury to either the silo or the machine, due to contact, will be prevented.

The invention is susceptible of various changes in its form, proportions and minor details of construction and the right is herein reserved to make such changes as properly fall within the scope of the appended claims.

Having described the invention what is claimed is:—

1. A packing machine embodying a frame, a frustro-conical packing roller mounted beneath the frame at one end thereof, means for driving the roller, a combined packing and guide roller mounted beneath the opposite end of the frame and means for controlling the guide roller to regulate the direction of travel of the machine.

2. A packing machine embodying a frame, a frustro-conical packing member mounted beneath the frame at one end thereof, means for driving the roller, a combined packing and guide roller mounted beneath the opposite end of the frame, means for adjusting the guide roller to regulate the direction of travel of the machine and means for holding the guide roller in adjusted position.

3. A packing machine embodying a frame, a frustro-conical packing roller mounted beneath the frame at one end thereof, means for driving the roller, a bearing yoke pivotally mounted beneath the opposite end of the frame, a combined packing and guide roller mounted within the yoke and means connected to the yoke for controlling the position of the guide roller to regulate the direction of travel of the machine.

4. A packing machine embodying a frame, a frustro-conical packing roller mounted beneath the frame at one end thereof, means for driving the roller, a bearing yoke pivotally mounted beneath the opposite end of the frame, a combined packing and guide roller mounted within the yoke, a guide yoke connected to the bearing yoke, a guide bar having one end connected to the guide yoke and means connected to the opposite end of the guide bar for adjusting the position of the guide roller and holding the said roller in adjusted position to regulate the direction of travel of the machine.

In testimony whereof we affix our signatures.

JOHN E. DOBSON.
SAMUEL M. CROOKSHANK.